(12) United States Patent
Kraut

(10) Patent No.: US 8,379,058 B2
(45) Date of Patent: Feb. 19, 2013

(54) METHODS AND APPARATUSES TO ARBITRARILY TRANSFORM WINDOWS

(75) Inventor: Joel Kraut, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1115 days.

(21) Appl. No.: 12/233,455

(22) Filed: Sep. 18, 2008

(65) Prior Publication Data

US 2009/0303242 A1  Dec. 10, 2009

Related U.S. Application Data

(60) Provisional application No. 61/059,660, filed on Jun. 6, 2008.

(51) Int. Cl.
*G09G 5/00* (2006.01)
*G06F 3/048* (2006.01)

(52) U.S. Cl. .................. 345/647; 345/582; 715/788

(58) Field of Classification Search .................. 345/647, 345/582

See application file for complete search history.

(56) References Cited

U.S. PATENT DOCUMENTS

| | | | | |
|---|---|---|---|---|
| 5,600,346 A * | 2/1997 | Kamata et al. | ................. | 715/807 |
| 6,016,145 A * | 1/2000 | Horvitz et al. | ................. | 715/788 |
| 6,229,542 B1 * | 5/2001 | Miller | ............................ | 715/782 |
| 6,396,520 B1 * | 5/2002 | Ording | ........................... | 715/798 |
| 6,573,915 B1 * | 6/2003 | Sivan et al. | .................... | 715/781 |
| 6,577,330 B1 * | 6/2003 | Tsuda et al. | .................... | 715/782 |
| 7,249,327 B2 * | 7/2007 | Nelson et al. | .................. | 715/782 |
| 7,412,650 B2 * | 8/2008 | Gallo | ............................ | 715/700 |
| 7,412,662 B2 * | 8/2008 | Sadek et al. | ................... | 715/781 |
| 7,512,902 B2 * | 3/2009 | Robertson et al. | ............ | 715/848 |
| 7,552,397 B2 * | 6/2009 | Holecek et al. | ................ | 715/788 |
| 7,573,490 B1 * | 8/2009 | de Waal | ........................ | 345/649 |
| 7,610,563 B2 * | 10/2009 | Nelson et al. | .................. | 715/839 |
| 7,817,163 B2 * | 10/2010 | Hanggie et al. | ................ | 345/619 |
| 2005/0010876 A1 * | 1/2005 | Robertson et al. | ............ | 715/782 |
| 2005/0088447 A1 * | 4/2005 | Hanggie et al. | ................ | 345/545 |
| 2005/0174346 A1 * | 8/2005 | Park et al. | ...................... | 345/422 |
| 2005/0229108 A1 * | 10/2005 | Sadek et al. | ................... | 715/764 |
| 2006/0061583 A1 * | 3/2006 | Spooner et al. | ................ | 345/582 |
| 2006/0082597 A1 * | 4/2006 | McDaniel et al. | ............ | 345/648 |
| 2006/0107229 A1 * | 5/2006 | Matthews et al. | ............. | 715/782 |

* cited by examiner

*Primary Examiner* — M Good Johnson
(74) *Attorney, Agent, or Firm* — Blakely, Sokoloff, Taylor & Zafman LLP

(57) ABSTRACT

Exemplary embodiments of methods and apparatuses to arbitrarily transform windows are described. Data associated with a first transformation may be obtained. The first transformation may be applied to a first window. The first transformation may relate a first texture point of the first window to a first arbitrary point. The first transformation may include a non-linear transformation. A second transformation is created to a second window based on the first transformation. The second window may be associated with the first window. The second transformation may relate a second texture point of the second window to a second arbitrary point.

51 Claims, 12 Drawing Sheets

METHODS AND APPARATUSES TO ARBITRARILY TRANSFORM WINDOWS

This application claims the benefit of prior U.S. Provisional Patent Application No. 61/059,660, entitled "Methods and Apparatuses to Arbitrarily Transform Windows", filed Jun. 6, 2008, which is hereby incorporated by reference.

FIELD

At least some embodiments of the present invention relate generally to graphical user interfaces, and more particularly, to texture mapping.

BACKGROUND

Texture mapping refers to adding a detail, a surface texture, a color, and the like features to a computer-generated graphic or 3D model. A texture map may be applied to the surface of a shape, or polygon. This process may be akin to applying patterned paper to a plain white box.

FIG. 1 illustrates a transformation of a rectangular window 105 displayed on a screen 101 into an arbitrary shape window 107 displayed on screen 102 as the window minimizes to a docking bar. As shown in FIG. 1, a rectangular child window 106, which is related to window 105, may be displayed on a screen 101. Child window 106 may be, e.g., a sheet that appears on a "save" panel, a drawer, a menu, and the like. Window 105 may have a shadow 104. A docking bar ("dock") 103 may be displayed on screen 101. The dock, as in Mac® Operating System produced by Apple Inc., located in Cupertino, Calif., may be used to display frequently used applications, applications that are currently executed by the processor of the data processing system, or both.

As shown in FIG. 1, window 105 is transformed to window 107 having an arbitrary shape as it slides into a dock 108 on a screen 102. As shown in FIG. 1, the child window is hidden when parent window 107 arbitrarily transforms its shape. That is, the child window may not mimic the shape and motion of the parent window, as the parent window arbitrarily transforms its shape. As shown in FIG. 1, shadow 104 disappears when window 107 arbitrarily transforms its shape.

Window decorations, such as drop shadows (e.g., shadow 104) may be generated in a window server apart from window content generation. If a window transforms its shape, a shadow bitmap may be re-regenerated based on the transformed shape. This is a very expensive operation, and is impractical in situations where the shape of a window changes with every screen refresh, such as during Genie™ effect or Expose™ animation, as in Mac OS X® Operating System produced by Apple, Inc., located in Cupertino, Calif. Creating new shadows each frame may quickly exhaust the server's shadow bitmap cache, leading to more slow-downs.

SUMMARY OF THE DESCRIPTION

Exemplary embodiments of methods and apparatuses to arbitrarily transform windows are described. Data associated with a first transformation may be obtained. The first transformation may be applied to a first window. The first transformation may relate a first texture point of the first window to a first arbitrary point. The first transformation may include a non-linear transformation. A second transformation is created to a second window based on the first transformation. The second window may be associated with the first window. The second transformation may relate a second texture point of the second window to a second arbitrary point. The second transformation may be applied to the second window.

In at least some embodiments, data associated with a pre-existing relationship between the second window and the first window are obtained. The second transformation is created such that the pre-existing relationship between the first window and the second window is preserved.

In at least some embodiments, creating the second transformation includes matching a second untransformed screen point of the second window to one or more structure points of the first transformation. A second structure point for the second transformation is provided based on matching.

In at least some embodiments, the first structure point may be copied to provide a second structure point for the second transformation if the second untransformed screen point matches to the first structure point. The structure points of the first transformation may be interpolated to generate a second structure point for the second transformation if the second untransformed screen point is between the first structure points of the first transformation. A second structure point for the second transformation may be generated based on characteristics of the first transformation and an association of the second untransformed screen point of the second window to the first window. In one embodiment, the second window includes a shadow of the first window.

In at least some embodiments, the first transformation may be applied to a first (e.g., untransformed) window to display a second (e.g., transformed) window on a screen. The first transformation may include a non-linear transformation.

In at least some embodiments, a second transformation may be generated to a first (e.g., untransformed) shadow based on the first transformation. The first shadow is associated with the first window. The second transformation may be applied to the first shadow to display a second (e.g., transformed) shadow associated with the second window. The second transformation may be generated by extending the first transformation. The second transformation may be then applied to the first shadow.

In at least some embodiments, the first shadow is compressed. One or more layers referring to the compressed first shadow may be generated. Each of the one or more layers referring to the compressed first shadow may be matched to a first structure associated with the first transformation. A second structure associated with the second transformation may be calculated based on matching for each of the one or more layers referring to the compressed first shadow.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
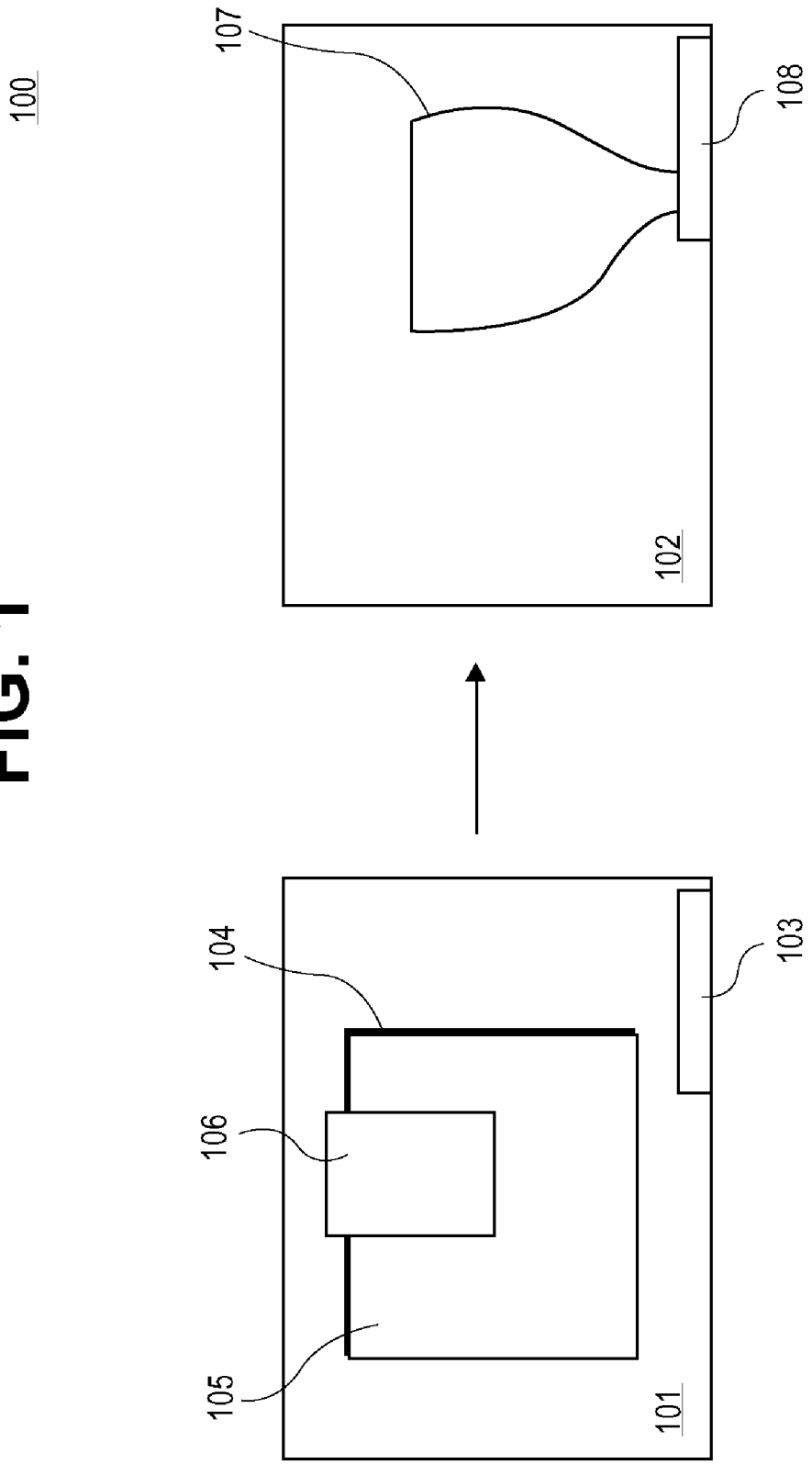
FIG. 1 illustrates a transformation of a rectangular window 105 displayed on a screen 101 into an arbitrary shape window 107 displayed on screen 102 as the window minimizes to a docking bar.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

Figure 2:
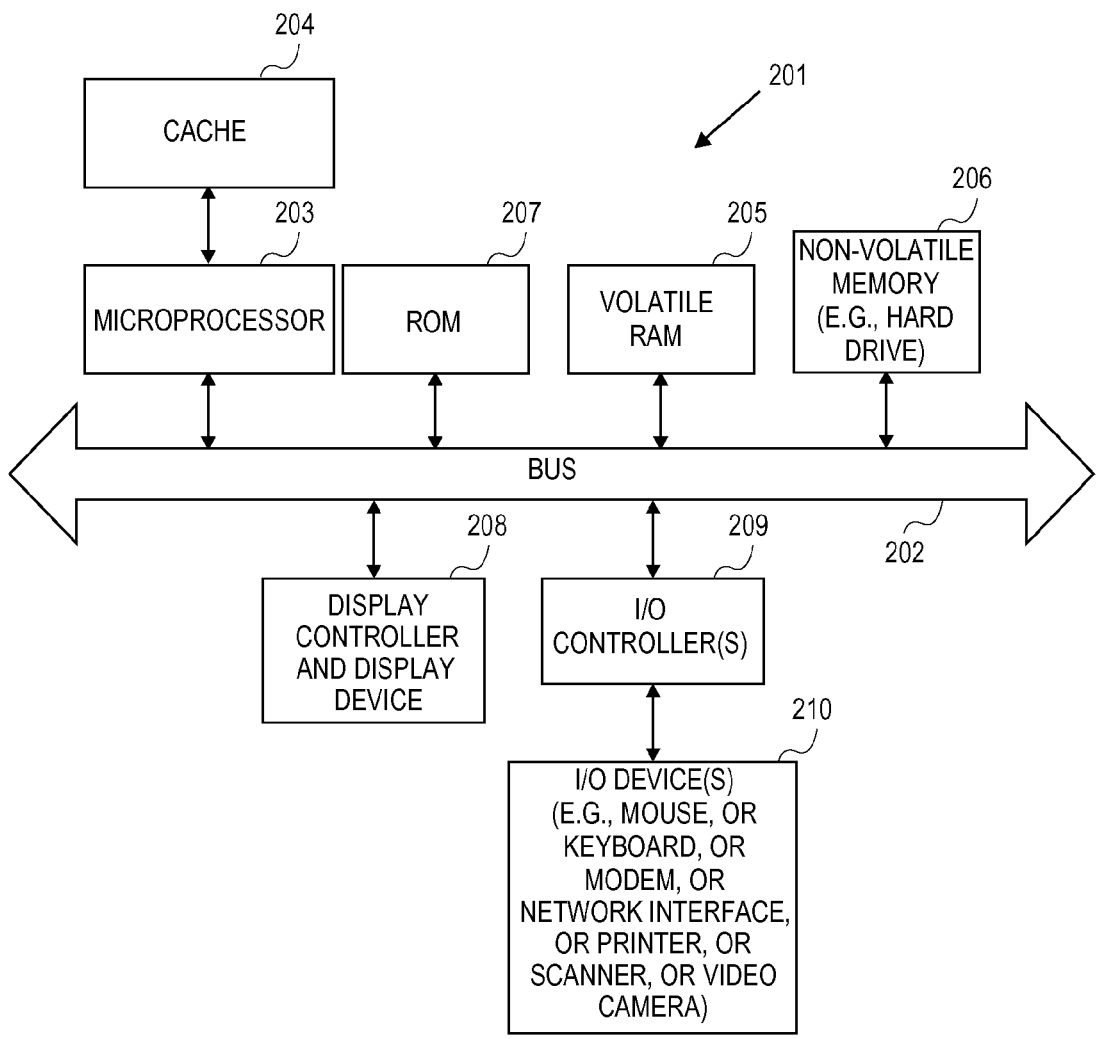
FIG. 2 shows one example of a typical computer system which may be used with the present invention.

FIG. 2 shows one example of a typical computer system which may be used with the present invention. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 2 may, for example, be an Apple Macintosh® computer.

As shown in FIG. 2, the computer system 201, which is a form of a data processing system, includes a bus 202 which is coupled to a microprocessor 203 and a ROM 207 and volatile RAM 205 and a non-volatile memory 206. The microprocessor 203, which may be, for example, a G3 or G4 microprocessor from Motorola, Inc., or IBM is coupled to cache memory 204 as shown in the example of FIG. 2. The bus 202 interconnects these various components together and also interconnects these components 203, 207, 205, and 206 to a display controller and display device(s) 208 and to peripheral devices such as input/output (I/O) devices 210 which may be mice, keyboards, modems, network interfaces, printers, scanners, video cameras and other devices which are well known in the art.

Typically, the input/output devices 210 are coupled to the system through input/output controllers 209. The volatile RAM 205 is typically implemented as dynamic RAM (DRAM) which requires power continually in order to refresh or maintain the data in the memory. The non-volatile memory 206 may be a magnetic hard drive, a magnetic optical drive, an optical drive or a DVD RAM and other type of memory systems which maintain data even after power is removed from the system. The non-volatile memory 206 may be a random access memory.

While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers and/or adapters as is well known in the art. In one embodiment the I/O controller 209 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 207, volatile RAM 205, non-volatile memory 206, cache 204 or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 203, or microcontroller.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 2. Portions of this software and/or data may be stored in any one of these storage devices.

Thus, a machine readable medium includes any mechanism that provides (i.e., stores and/or transmits) information in a form accessible by a machine (e.g., a computer, network device, cellular phone, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 100 of FIG. 2.

Many of the methods of the present invention may be performed with a digital processing system, such as a conventional, general-purpose computer system. The computer systems may be, for example, entry-level Mac mini® and consumer-level iMac® desktop models, the workstation-level Mac Pro® tower, and the MacBook® and MacBook Pro® laptop computers produced by Apple Inc., located in Cupertino, Calif. Small systems (e.g. very thin laptop computers) can benefit from the methods described herein. Special purpose computers, which are designed or programmed to perform only one function, or consumer electronic devices, such as a cellular telephone, may also perform the methods described herein.

Figure 3:
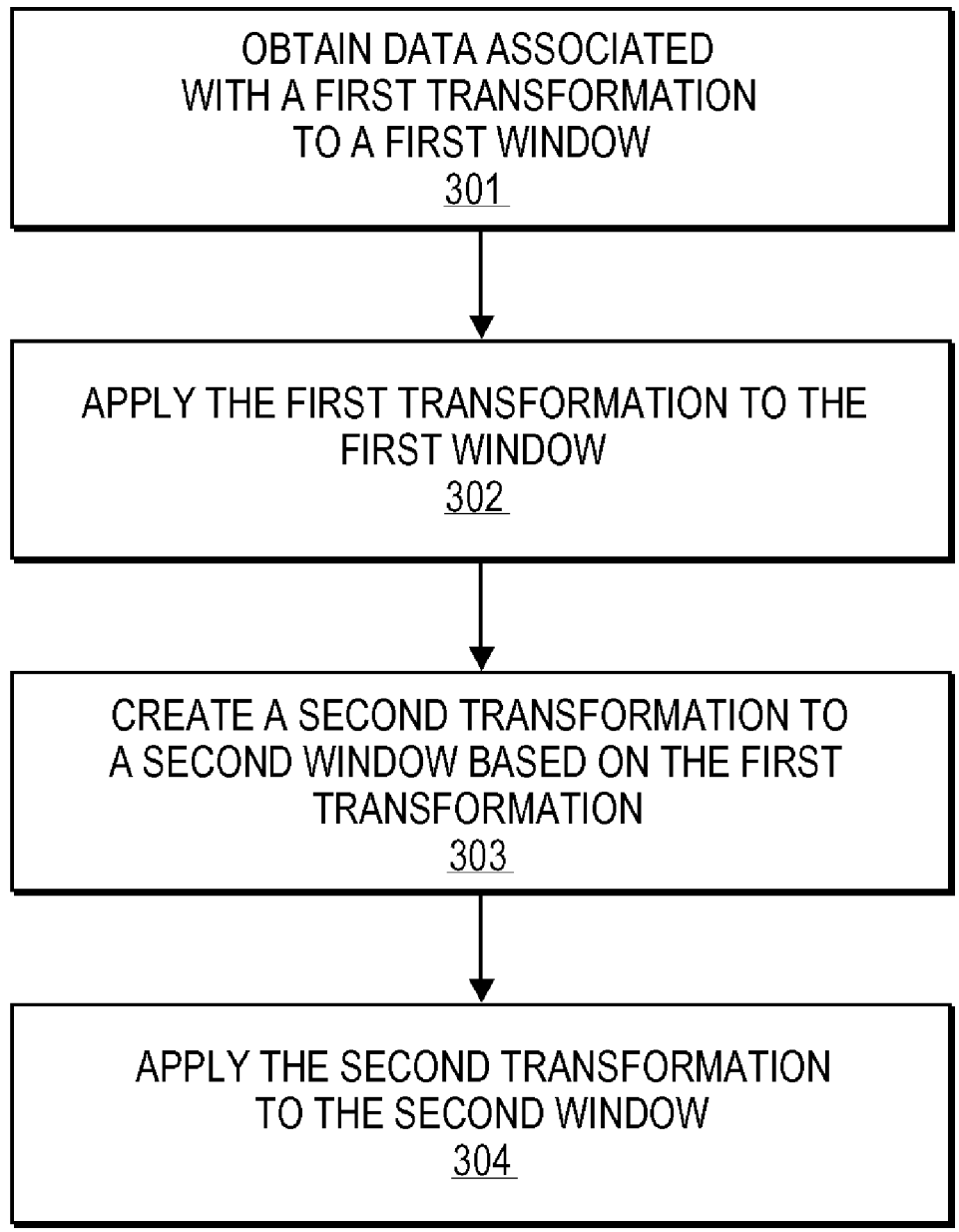
FIG. 3 is a flowchart of one embodiment of a method to arbitrarily transform windows.

FIG. 3 is a flowchart of one embodiment of a method 300 to arbitrarily transform windows. Method 300 begins with operation 301 that involves obtaining data associated with an arbitrary ("first") transformation to a first window. The first transformation may relate a first texture point of the first window to a first arbitrary point, as described in further detail below. At operation 302, the first transformation may be applied to the first window. The arbitrarily transformed first window may be displayed on the screen.

Figure 4:
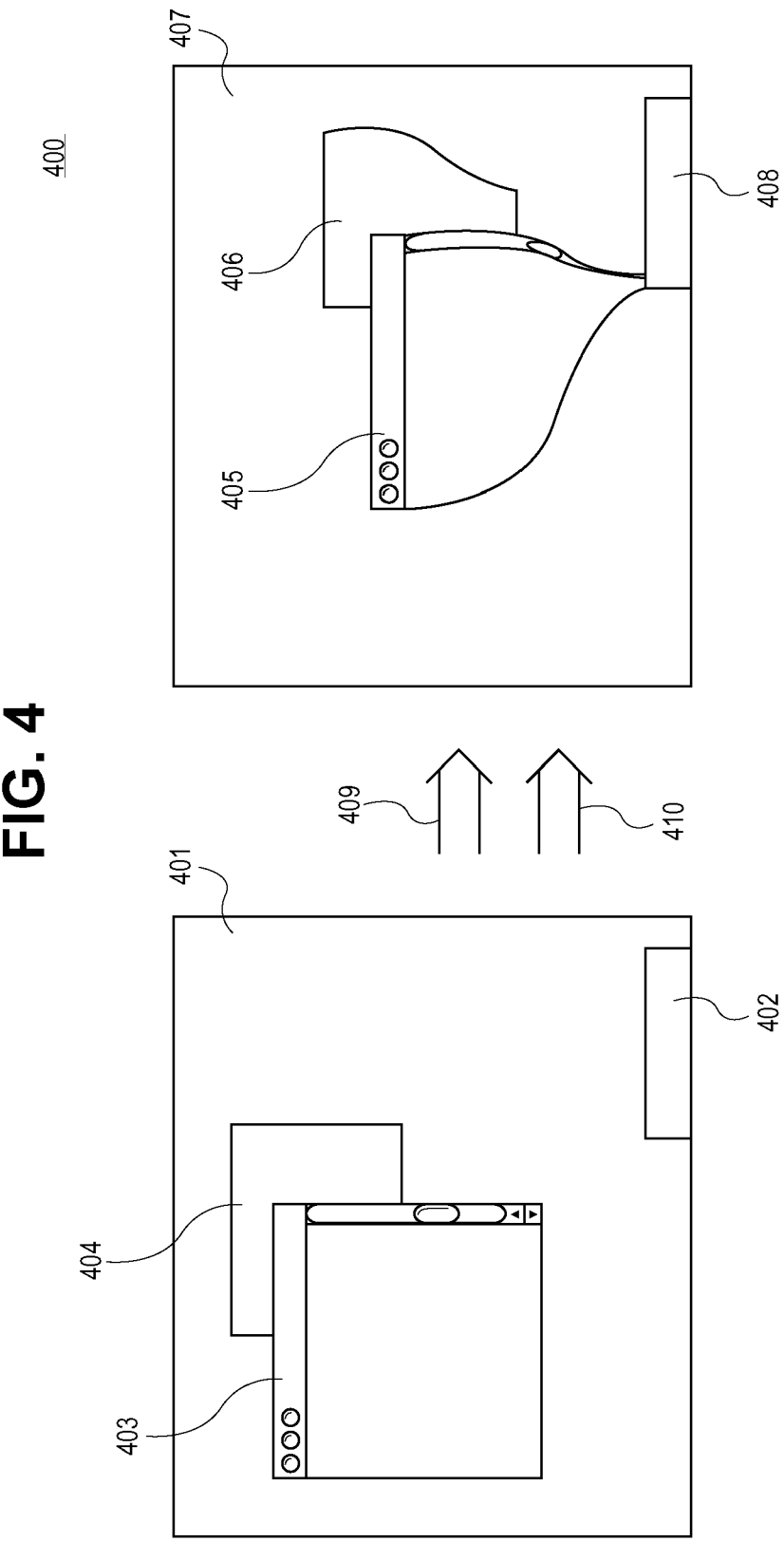
FIG. 4 illustrates one embodiment of arbitrarily transforming windows.

FIG. 4 illustrates one embodiment of arbitrarily transforming windows. A window may be a visual area, typically rectangular in shape, containing a user interface, displaying the output of and allowing input for a running computer process. The windows on the screen may be manipulated with a pointer. As shown in FIG. 4, a window 403 and a window 404 are displayed on a screen 401. In one embodiment, window 404 is associated with window 403.

Association of window 404 with window 403 may include spatial association, ordering association, and/or the other ways the windows 404 and 403 are present on the screen. For example, when window 403 moves a certain distance on screen 401, the window 404 moves the certain distance too to preserve the spatial association with window 403. For another example, when window 403 is brought to the front of a stack of windows on screen 401, window 404 is also brought to the front of the stack of the windows to preserve the ordering association with window 403. In other words, the ordering association between the windows may incorporate depth. In one embodiment, window 404 is a child window and window 403 is a parent window. Window 404 may be, e.g., a sheet that appears on a "save" panel, a drawer, a menu, and the like. In one embodiment, the size of window 404 is different from the size of window 403. In one embodiment, the location of window 404 is different from the location of window 403.

As shown in FIG. 4, a dock 402 and dock 408, as in Mac® Operating System produced by Apple Inc., located in Cupertino, Calif., may be used to display frequently used applications, applications that are currently executed by the processor of the data processing system, or both.

As shown in FIG. 4, an arbitrary first transformation 409 is applied to window 403 displayed on a screen 401 to display a transformed window 405 on screen 407. As shown in FIG. 4, window 405 has an arbitrary shape as it minimizes into a dock 408 on a screen 407. In one embodiment, the arbitrary transformation 409 applied to window 403 to display window 405 includes a non-linear transformation. For example, the transformation applied to the window changes the shape of the window in a non-linear fashion.

Referring back to FIG. 3, method 300 continues with operation 303 that involves creating a second transformation to a second window based on the first transformation. The second transformation that is created based on the first transformation may relate a second texture point of the second window to a second arbitrary point, as described in further detail below. In at least some embodiments, obtaining data associated with a pre-existing relationship between the first window and the second window, and the second transformation to apply to the second window is created such that the pre-existing relationship between the first window and the second window is maintained. In other words, the second transformation for the second window may be created such that the second transformation visually preserves that relationship that the first window and the second window had in the non transformed state. At operation 304 the second transformation is applied to the second window. The transformed second window may be displayed on the screen while maintaining the association between the first window and the second window.

Referring back to FIG. 4, a second transformation 410 created based on the first transformation is applied to window 404 to display a transformed window 406 on a screen 407. Window 406 repeats the shape and motion of window 405 as the window 405 arbitrarily transforms its shape. That is, a second (e.g., child) window, which is associated with the first (e.g., parent) window, mimics the shape and motion of the first window, as the first window arbitrarily transforms its shape. In one embodiment, applying the arbitrary transformation to the window involves assigning a structure (e.g., a mesh structure) to the window that relates a texture point of the window to a screen point of the window. In one embodiment, the second transformation 410 applied to window 404 to display transformed window 406 includes a non-linear transformation. For example, the second transformation applied to the window changes the shape of the window in a non-linear fashion.

In one embodiment, generating the second transformation to the second window involves generating a new mesh which corresponds the texture coordinates of the second window to the screen coordinates of the second window while preserving the relationship for example, ordering, spatial, or both with the first (e.g., parent) window, as described in further detail below.

Figure 5:
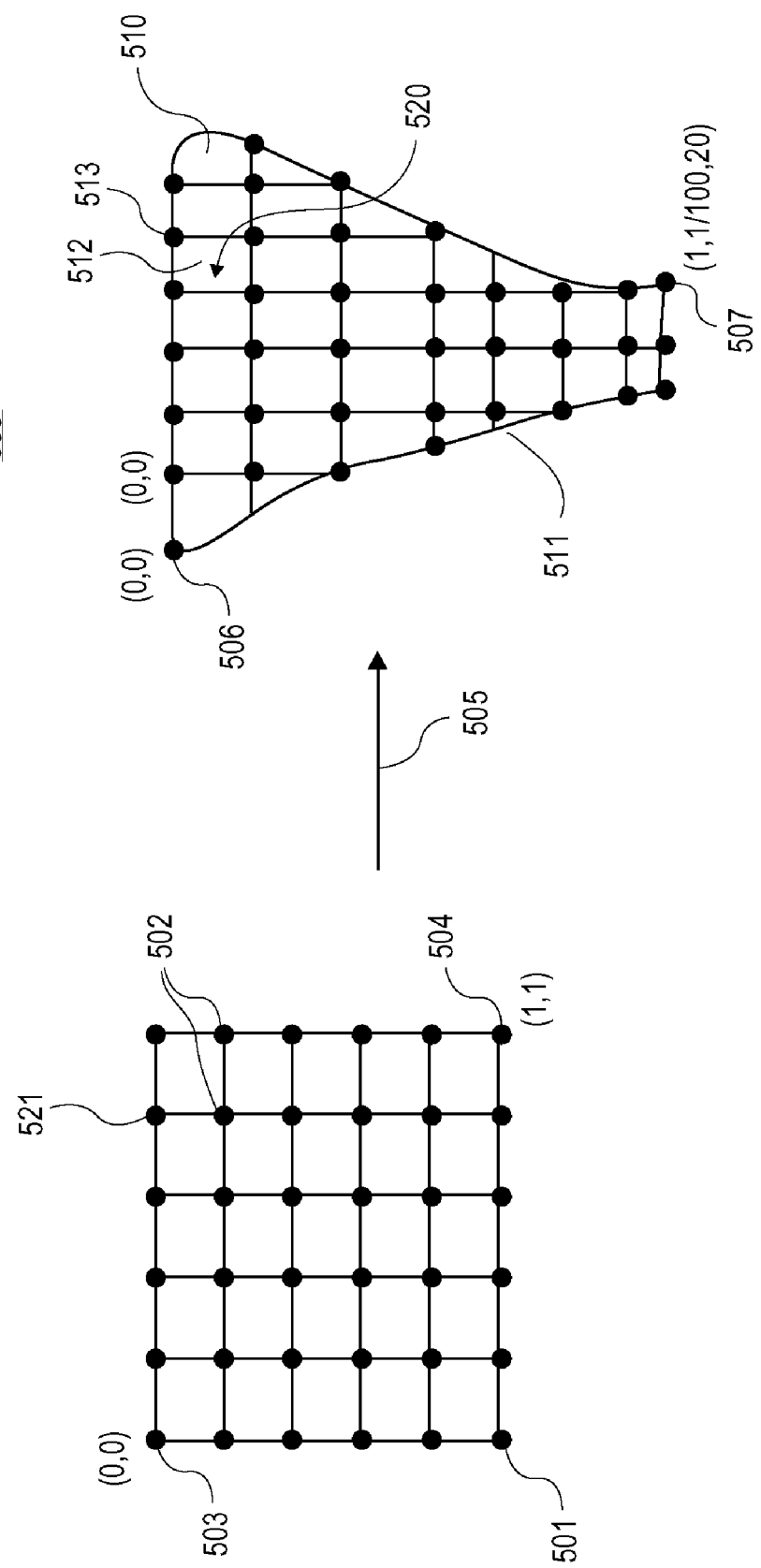
FIG. 5 illustrates one embodiment of a structure that maps texture coordinates of a window to arbitrary coordinates of the window.

FIG. 5 illustrates one embodiment of a structure ("mesh") 500 that maps texture coordinates of a window to arbitrary coordinates of the window. FIG. 5 shows a texture rectangle 501 that represents a window in a memory, e.g., a window buffer. Texture rectangle 501 may have a grid of texture points, such as texture points 502-504. Typically, the grid may change per frame of animation, and may contain about 100 points. In one embodiment, the texture rectangle 501 represents mesh 500 in texture coordinates. The position of each of the texture points in the texture rectangle 501 defined by the coordinates of the texture point. For example, texture point 503 may have coordinates (0,0) within texture rectangle 501, and texture point 504 may have coordinates (1,1) within the texture rectangle 501. When an arbitrary transformation 505, for instance, the Genie™ effect, is applied to a window (not shown), as the window slides to the dock (not shown), the window may be assigned a structure 500 (e.g., a mesh) that corresponds window texture coordinates, such as the coordinates of texture points 502-504, to the arbitrary coordinates of the window on the screen. As shown in FIG. 5, a structure 510 represents mesh 500 in screen coordinates.

As shown in FIG. 5, mesh 500 maps coordinates of the texture points, such as texture points 502-504 into an arbitrary shape 511 to display a transformed window on a screen. As shown in FIG. 5, the coordinates of texture point 503 (0,0) are mapped to screen coordinates (0 pixels, 0 pixels) at point 506, and coordinates of texture point 504 (1,1) are mapped to the coordinates (100 pixels, 20 pixels) at a point 507. Generally, a structure ("mesh") includes a set of pairs of pairs of numbers. Each pair of pairs is a mesh point. Each mesh point corresponds one texture coordinate, such as a point 503 in the graphical representation of a window) to one screen coordinate, e.g., an x/y point 506 on the pixels of the screen. Generally, for a non-linear transformation, a relationship between the texture coordinates and the screen coordinates of two mesh points may not necessarily be the same. As shown in FIG. 5, for two mesh points of the mesh 500, the relationship between their texture coordinates 503 (0,0) and 504 (1,1) is not the same as the relationship between their screen coordinates 506 (0,0) and 507 (100,20).

That means that one can non-linearly transform the screen image, e.g., stretch, rotate, and distort the screen image of the texture by non-uniformly varying the screen points of the mesh. As shown in FIG. 5, structure 510 may be represented as a series of cells, such as a cell 512. Each cell may have four mesh point corners, such as a mesh point corner 513. When the cell is drawn, screen pixels not at a corner (i.e. for which there are no defined texture coordinates, such as a point 520 may be drawn with texture coordinates interpolated from the corners, such as corner 521. A mesh 500 is designed to apply to one window. There are situations, however, when a second window is generated that preserves a fixed relationship to a first window. If the first window and the second window are not the same size and at the same location, the same mesh, such as mesh 500 cannot be used. If the same mesh is used for the first window and the second window, the relationship between these windows is not preserved.

The second window may be a child window, like sheets (e.g. save panels) and drawers. Typically, when the parent window moves a certain distance, the child window moves the certain distance too. Thus, the relationship between the child window and the parent window may be preserved. But what if the parent window undergoes some transformation whose pattern is not obvious, for example, when a window slides down into the dock via the Genie effect, it is not at all clear where that window's open drawer needs to go, or how it needs to be deformed. Consequently, today's implementation hides the child window to avoid the dilemma. What is needed is a way to create a new mesh for the child window that visually matches the mesh on the parent window.

Figure 6:
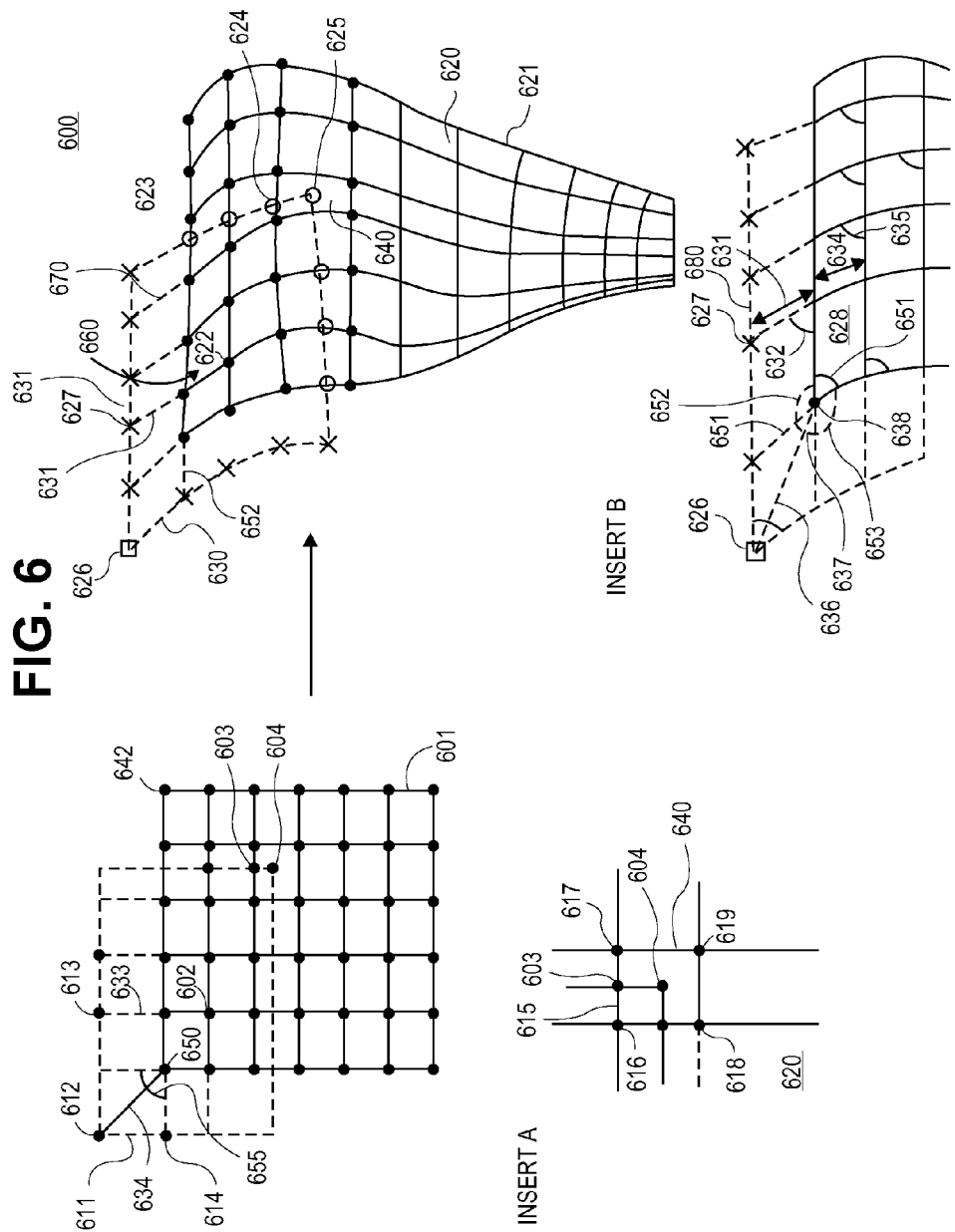
FIG. 6 illustrates one embodiment of creating a second transformation based on a first transformation.

FIG. 6 illustrates one embodiment of creating a second transformation based on a first transformation. Creating the second transformation based on the first transformation that preserves the pre-existing relationship between the first window and the second window may include mapping an arbitrary texture coordinate rectangle into a new structure (e.g., a new mesh) that corresponds to all or a portion of an original structure (e.g., old mesh). This means that (a) structure points internal to both the original structure's texture rectangle and the new texture rectangle are shared; (b) points in the new structure that don't exist in the old structure (for instance, if the new rectangle's edges are inside the original rectangle's edges) are correctly interpolated; and c) points in the new structure outside the bounds of the old structure (for instance, if the new rectangle's edges are outside the old rectangle) are extended by a certain distance and in the certain direction to continue the visual flow of the old structure. The extension distance and direction may be calculated at the same time the rest of the mesh is. In one embodiment, the extension distance is calculated based on the scale of the bordering old mesh cells. In one embodiment, the direction of extension is calculated based on rotation of the old bordering mesh cell's sides. This solution enables such things as transformation of child windows, e.g. a window with an open drawer or sheet minimizing to the dock could keep that child window open and get visually correct results with a minimum of effort, no matter the size or shape of the child window. In one embodiment, a new mesh for the second window is generated that visually correlates with the mesh for the first window so that it maintains that relationship between the first window and the second window. That is, a new mesh can be generated based on an old mesh on a texture rectangle, and a rectangle with a relationship to the original mesh's window.

As shown in FIG. 6, an untransformed screen rectangle 601 represents a first window, e.g., a parent window in a memory, e.g., a window buffer. An untransformed screen rectangle 611 represents a second window, e.g., a child window in the memory, e.g., a window buffer. Untransformed screen rectangle 601 has a first grid of untransformed screen points, such as points 602 and 642. Untransformed screen rectangle 611 has a second grid of untransformed screen points, such as points 602-604, and 612-614. The position of each of the points in each of the rectangles 601 and 611 may be defined by their coordinates.

As shown in FIG. 6, a structure 620 (e.g., a first mesh) maps the coordinates of the points of the rectangle 601, such as a point 602 and 642, into an arbitrary shape 621 to display a transformed first window on a screen. As shown in FIG. 6, each structure ("mesh") point of structure 620, such as mesh point 622, relates coordinates of the untransformed screen point, such as point 602, to the arbitrary coordinates on the screen associated with a point on the screen, as described above with respect to FIG. 5. As shown in FIG. 6, a structure (e.g., a second mesh) 630 is created based on the structure 620. As shown in FIG. 6, a rectangle 611 is mapped into structure (e.g., a second mesh) 630 that corresponds to all or a portion of an original structure (e.g., first mesh) 620.

Creating of the second transformation to apply to the second window may include matching the untransformed screen point, such as points 602-604, and 612-614 of the second window to one or more structure points of the structure ("mesh") 620. A structure point of the structure 630 may be generated based on matching, as described in further detail below.

As shown in FIG. 6, the points in structure 630 internal to both the rectangle 601 and the rectangle 611 that match with the points in structure 620, such as a point 622, are shared. Points in structure 630 that do not match with the points in the structure 620, such as points 623, 624, and 625 may be generated by interpolation from the neighboring points of structure 620. Points in the structure 630 that are outside the bounds of the structure 620, such as points 626 and 627 are extended by a certain distance and in the certain direction to continue the visual flow of the structure 620, as described above. Structure 630 may be applied to the second window to non-linearly transform the second window while maintaining the association that the second window and the first window had before the transformation.

Figure 7:
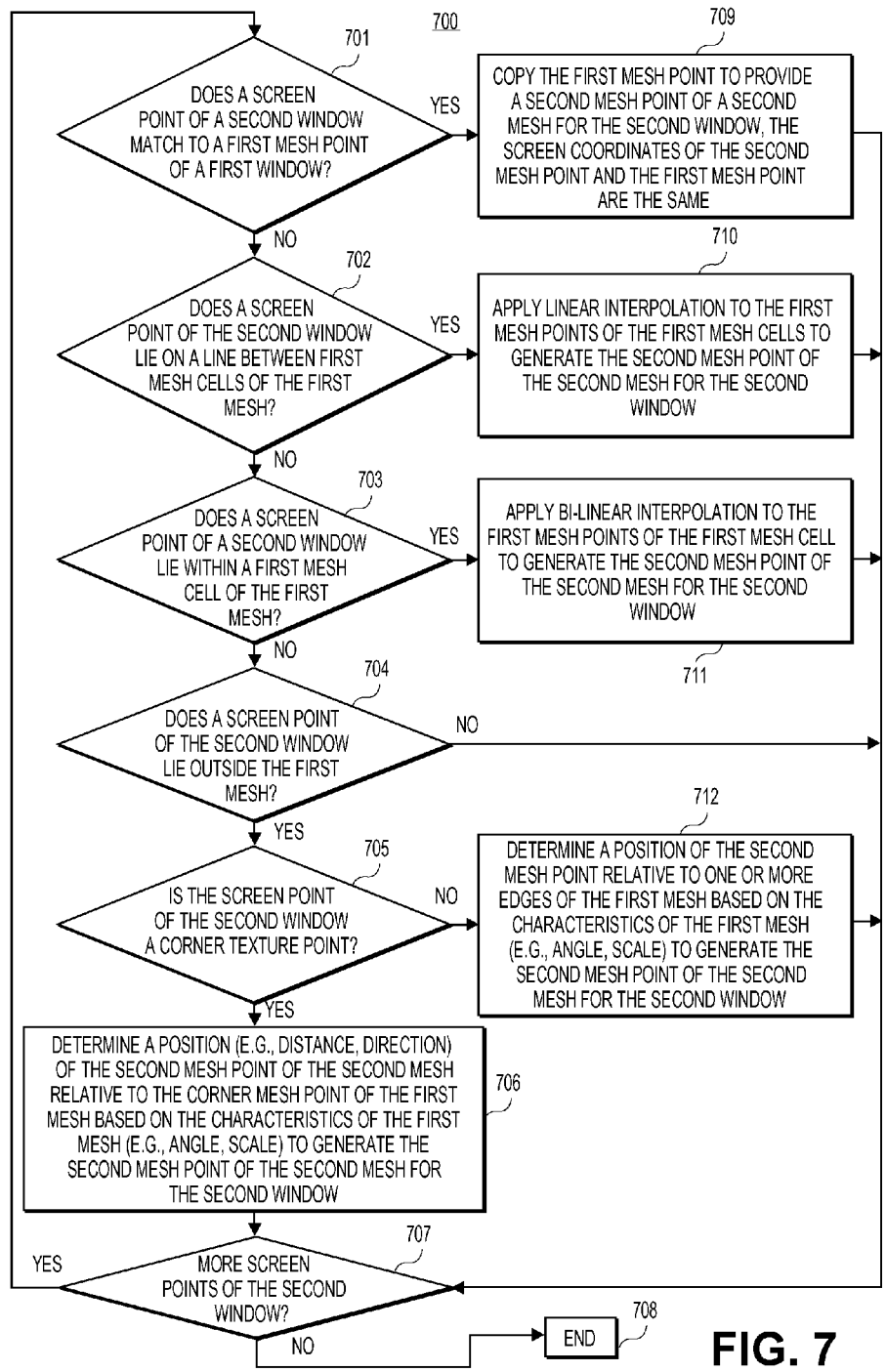
FIG. 7 is a flowchart of one embodiment of a method to generate a second transformation based on the first transformation.

FIG. 7 is a flowchart of one embodiment of a method 700 to generate a second transformation based on the first transformation. Method 700 begins with operation 701 that involves determining whether an untransformed screen point of a second window associated with a first window matches to a first mesh point of a first mesh associated with the first window. If the untransformed screen point of the second window matches to the first mesh point of the first mesh, at operation 709 the first mesh point is copied to provide a second mesh point for a second mesh associated with the second window. Method 700 then goes to operation 707 that involves determining whether there are more untransformed screen points of the second window.

Referring back to FIG. 6, in at least one embodiment, if the untransformed screen point of a rectangle representing the second window, such as point 602 of rectangle 611, matches to the structure point of the first structure, such as structure point 622 of structure 620, the structure point 622 is copied to provide a structure point to the structure 630. In one embodiment, copying of the structure point includes modifying the texture coordinates of the structure point of the first structure to match to the second window while preserving screen coordinates of the structure point of the first structure, so that the screen coordinates of the structure point of the second structure and the screen coordinates of the structure point of the first structure are the same. As shown in FIG. 6, structure point 622 is shared between structure 620 and structure 630.

Referring back to FIG. 7, if the untransformed screen point of the second window does not match to the first mesh point of the first window, at operation 702 determination is made whether the untransformed screen point of the second window lies on a line between first mesh cells of the first mesh. If the untransformed screen point of the second window lies on the line between the first mesh cells of the first mesh, at operation 710, a linear interpolation is applied to one or more first mesh points of the first mesh to generate the second mesh point for the second mesh for the second window. Method 700 then continues at operation 707 that involves determining whether there are more untransformed screen points of the second window.

Referring back to FIG. 6, insert A shows an enlarged view of a untransformed screen point 603 of rectangle 611 representing the second window that lies on a line 615 separating a structure cell 640 of the structure 620 from other structure cells of the structure 620. In at least one embodiment, a structure point 624 for a structure 630 is generated by applying a linear interpolation to one or more structure points, e.g., the structure points 616 and 617, of the structure 620 that are adjacent to the untransformed screen point 603.

Referring back to FIG. 7, if the untransformed screen point of the second window does not lie on the line between first mesh cells of the first mesh associated with the first window, at operation 703 a determination is made whether the untransformed screen point of the second window lies within a first mesh cell of the first mesh. If the untransformed screen point of the second window lies within a first mesh cell of the first mesh, a bilinear interpolation is applied to one or more first mesh points of the first mesh cell to generate the second mesh point of the second mesh for the second window at operation 711. Method 700 then continues at operation 707 that involves determining whether there are more untransformed screen points of the second window.

Referring back to FIG. 6, insert A shows an enlarged view of an untransformed screen point 604 of rectangle 611 representing the second window that lies within a structure cell 640 of the structure 620. In at least one embodiment, a structure point 625 for a structure 630 is generated by applying a bilinear interpolation to one or more structure points; e.g., the structure points 616, 617, 618, and 619 of the structure 620, that are in the vicinity of the untransformed screen point 604.

Referring back to FIG. 7, if the untransformed screen point of the second window does not lie within a first mesh cell of the first mesh associated with the first window, at operation 704 a determination is made whether the untransformed screen point of the second window lies outside the first mesh. If the untransformed screen point of the second window does not lie outside the first mesh, method proceeds to operation 707. If the untransformed screen point of the second window lies outside of the first mesh, such as points 612-614 in FIG. 6, a second mesh point for the second mesh is generated based on characteristics of the first mesh and an association of the second untransformed screen point of the second window to the first window. More specifically, at operation 705 a determination may be made whether the untransformed screen point of the second window is a corner point. If the untransformed screen point of the second window is not a corner point, such as points 613 and 614 in FIG. 6, at operation 712 a position (e.g., distance, direction) of the second mesh point is determined relative to one or more edges of the first mesh based on the characteristics of the first mesh (e.g., angle, scale). The second mesh point of the second mesh for the second window is generated based on the determined position.

In one embodiment, if a portion of the rectangle 611 is outside of the structure 620, a mesh point for mesh 630, such as mesh points 627 is generated along the height, such as distance 631, and/or width, such as width 662, of the mesh structure 620, depending on the direction. This is going to be first order continuity between the old mesh structure 620 and the new mesh structure 630. New grid cells, such as a cell 660, are created based on this mesh point, at the distance 631 because that's the simplest way to continue the mesh. Internal lines of mesh structure 630, such as lines 670 may continue the mesh lines of mesh structure 620.

Method 700 then continues at operation 707 that involves determining whether there are more untransformed screen points of the second window.

Referring back to FIG. 6, insert B shows an enlarged view of a structure point 627 of structure 630 relative to an edge 628 of the structure 620. As shown in FIG. 6, the position of structure point 627 is determined by the length of extension 631 and an angle 632 at which the extension crosses edge 628. That is, creating the new mesh points involves determining the angle from which the new mesh points come off the edge of the old mesh and the scale which indicates how far the new mesh points are going to come off the edge of the old mesh.

In one embodiment, to determine the position of the structure point 627, the length of extension 631 is determined by multiplying the original distance, such as a distance 633, between the respective untransformed screen point 613 of rectangle 611 and the edge of the rectangle 601 by a scale factor.

The scaling factor may be determined based on one or more characteristics of structure 620. In at least some embodiments, the characteristics of structure 620 may include one or more angles that are formed at crossings of the grid lines of the structure 620, such as an angle 635, one or more distances between the lines of the structure 620, such as a distance 634, or a combination thereof. The structure point 627 may be offset by an angle determined from structure 620, as described in further detail below.

For example, one or more mesh cells that abide the edge of the mesh 620 may be used to determine the angle and the scaling factor. The edge of structure 620 being the edge of the new cell. For example, the angles, such as angle 651 at the edges that are "parallel" to the new edge of new structure 630 and the angle of the edge that is "perpendicular" to the old edge of structure 630, may be used to determine position of the new mesh point.

"Perpendicular" means if the windows were untransformed, and if every angle were 90 degrees. "Parallel" for the untransformed windows means in fact parallel. In a transformed context the edges may not necessarily be perpendicular and/or parallel. In one embodiment, to determine an angle for a position of a new mesh point, a bilinear interpolation may be applied between the edges of mesh structure 620 based on how far over the new edge is.

In one embodiment, the scale is determined from a bilinear interpolation between the scales of the two edges of structure 620. The scale for each of the edges of the structure 620 may be determined from the length and the screen space of the edge of structure 620 relative to the length and the space of the edge of rectangle 601. In one embodiment, the scale is determined from the relationship between the structure 620 and the grid of the rectangle 601.

That is, to determine the position of the new mesh point, the scale of each of the three edges of the cell, such as cell 660, that abuts the new point, such as point 627 are considered. The scales for each of the two opposite edges of cell 660 extending from structure 620 are determined from bilinear interpolation. And then the scales for each of these edges are averaged with the scale of the edge that is adjacent to these opposite edges, such as an edge 680. The reason to do that is because if a mesh is stretched in one direction but not in the other direction, then some of the edges may not match. In one embodiment, a threshold is applied to the scale, so that the scale doesn't become too low.

In at least some embodiments, the scaling factor is determined by extrapolating from the one or more distances between the lines of the structure 620 and/or from the one or more angles of the structure 620, by applying an interpolation to the one or more distances and/or to the one or more angles of the structure 620, by averaging the one or more distances between the lines of structure 620 and/or the angles of the structure 620, or a combination thereof. In at least some embodiments, the angle 632 relative to the edge of the structure 620 is determined by extrapolating from the one or more angles of the structure 620, by applying an interpolation to the one or more angles of the structure 620, by averaging the angles of the structure 620, or a combination thereof.

If the untransformed screen point of the second window is a corner point, such as a point 612 in FIG. 6, at operation 706 a position (e.g. distance, direction) of the second mesh point of the second mesh relative to the corner mesh point of the first mesh is determined based on the characteristics of the first mesh (e.g., an angle, scale) to generate the second mesh point of the second mesh for the second window.

In one embodiment, determining the position of point 626 includes determining an angle 637 from linearly interpolating from one or more tangents to each of the cell walls abutting old cell, such as a cell 628, to determine angles 653 and 652, and an original angle, e.g., an angle 655, that comes from the offset of the point 612 relative to rectangle 601. In one embodiment, the position of point 626 is determined by averaging between the tangents of the angles, such as angles 653 and 652.

Referring back to insert B in FIG. 6, the position of corner structure point 626 may be determined by a distance 636 and an angle 637 at which the extensions of the structure 620 at the corner structure point 638 are crossed. In one embodiment, distance 636 is determined by multiplying a distance 639 of corner point 612 relative to the corner point 650 of the rectangle 601 by a scaling factor. The scaling factor may be determined based on the characteristics of structure 620. In at least some embodiments, the characteristics of structure 620 may include a distance, e.g., distance 634, between the lines of the structure 630, one or more angles that are formed at crossings of the lines of the structure 620, e.g., an angle 651, or a combination thereof. In at least some embodiments, the scaling factor may be determined by extrapolating from the one or more distances between the lines of the structure 620 and/or from the one or more angles of the structure 620, by applying an interpolation to the one or more distances and/or to the one or more angles of the structure 620, by averaging the one or more distances between the lines of structure 620 and/or the angles of the structure 620, or a combination thereof. In at least some embodiments, the angle 637 relative to the corner of the structure 620 may be determined by extrapolating from the one or more distances between the lines of the structure 620, such as distance 634, and/or from the one or more angles of the structure 620, such as distance 634; by applying an interpolation to the one or more distances, such as distance 634, and/or to the one or more angles of the structure 620, such as distance 634, by averaging the one or more distances between the lines of structure 620, such as distance 634, and/or the angles of the structure 620, such as distance 634, or a combination thereof.

Next, at operation 707 a determination is made are there more untransformed screen points of second window to be mapped. If there are more untransformed screen point of the second window, method 700 returns to operation 701, if there are no more untransformed screen points of the second window to map, method 700 ends at 708.

Figure 8:
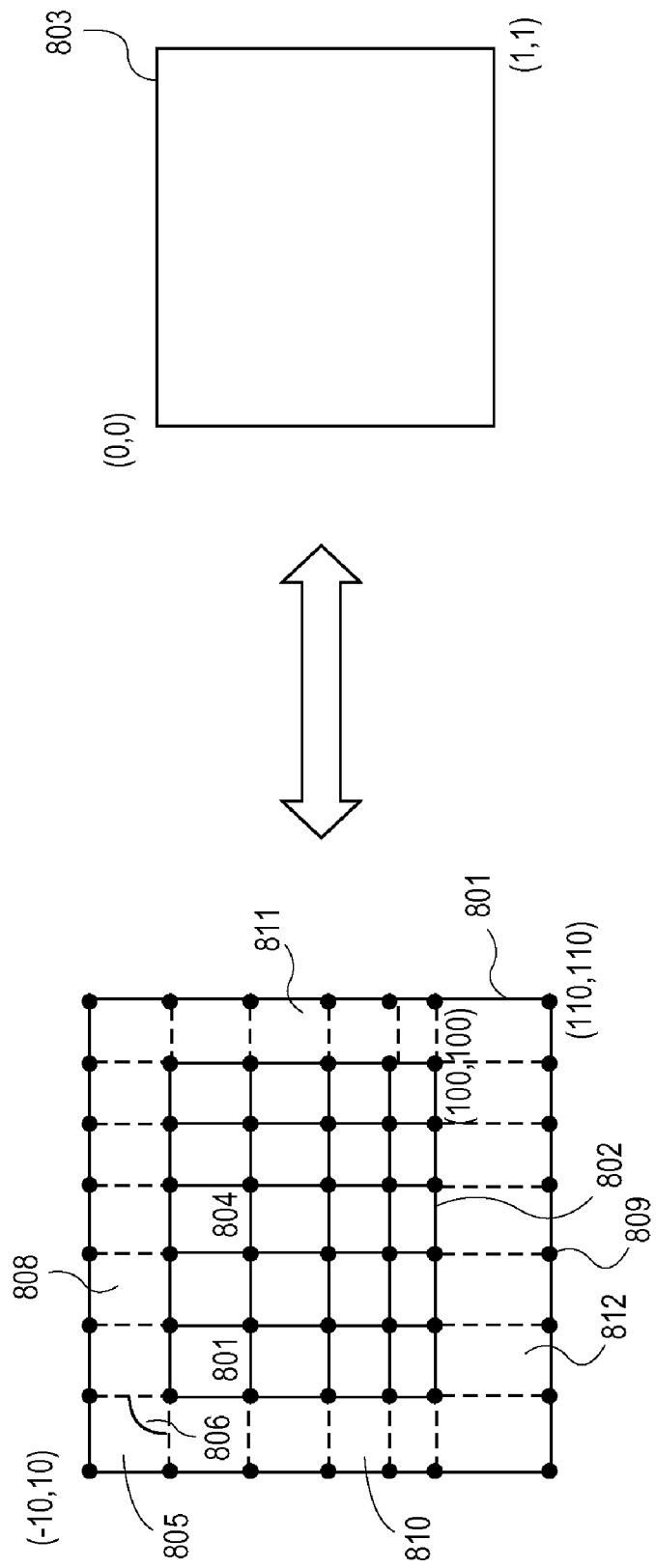
FIG. 8 illustrates another embodiment of creating a second transformation based on a first transformation.

That is, a new mesh is created to apply to, for example, to a child window. Creating the new mesh for the child window requires an old mesh from, for example, a parent window, as well as a rectangle representing the frame of the child window in the spatial context of the parent window ("rectangle"). For example, if a 100×100 pixel parent window is backed with a child window 10 pixels larger in all dimensions, a screen rectangle representing the child window 801 in the spatial context of the parent window 802 has coordinates [{−10, −10}, {110, 110}], as shown in FIG. 8. Creating the new mesh also requires a rectangle 803 with the bounds of the window's texture needs to be in the mesh ("texture rectangle"); this is useful for stretching or squashing a part of the texture to cover the whole window's area, as it may be needed if the window is a solid color. In that case the texture rectangle 803 may have coordinates [{0,0}, {1,1}].

The implementation first finds the extent of the rectangle 801 in the old mesh's cells, as described above with respect to FIGS. 6 and 7. In this case, "extent" means the extent of the subset of the mesh completely contained inside the rectangle. It then adds two rows and two columns to account for the edges that don't match up with the old mesh's edges, and which will therefore need to be synthesized, as described above. The new mesh is initialized to this size. For each cell on which the old and new mesh completely intersect (that is, each cell in the mesh subset mentioned earlier), such as for a cell 804, the implementation simply copies the old mesh's cells, transforming the texture coordinates appropriately to match the rectangle and texture rectangle, as described above. It's possible that any of the corner cells in the new mesh will be completely outside of the old mesh, such as for a cell 805. In this case only one mesh point intersects: the new cell's inside corner 806 will be shared with the old cell's outside corner. Because our algorithm for filling in the missing edge cell values involves copying and modifying data from bordering cells that are correct in the old mesh, these new corner cells that have no bordering old cell needs to be handled specially, as described above with respect to FIGS. 6 and 7. Because these cells are on the corners of the child window, their texture coordinates are known.

A point transform algorithm may be used to find the corresponding screen coordinates. The point transform algorithm is discussed below in further detail. For each edge that needs to be synthesized—top edge 808, bottom edge 809, left edge 810, and right edge 811—the implementation follows the same technique: for each new mesh cell on that edge, if the synthesized edge is not outside the old mesh, the new cell should be completely contained within an old mesh cell. If the synthesized edge is outside of the old mesh, the implementation creates a fake mesh cell, e.g., for a mesh cell 812 outside (but bordering) the old mesh.

This fake mesh cell may contain the new cell, so the implementation can follow the same algorithm. Two of the mesh points shared with the old mesh's edge cell are copied from the old mesh's edge cell. Two of the remaining four texture coordinates are known, as the synthesized edge is indeed the edge of the rectangle. The other two are interpolated from the old mesh's edge cell. The screen coordinates for the two new mesh points are then obtained through the point transform algorithm. Now the implementation has an old mesh cell, real or fake, that contains the new mesh cell. Two of the mesh points, the ones at the interior of the new cell, will be shared. Those are copied, with appropriately transformed texture coordinates. The other two are synthesized using the point transform algorithm.

The Point Transform Algorithm

Given a mesh (in this implementation, the old mesh) and a texture point, it yields the corresponding screen point, as described above with respect to FIGS. 6 and 7. In cases where the texture point is within the old mesh, the corresponding screen point is determined using a bilinear interpolation. If the texture point is outside the old mesh, the algorithm first notes the distance by which the texture point is outside the old mesh, as described above, and then brings it in to the closest point in the mesh. After the screen point for that mesh point has been found, the algorithm will transform that into a new screen point based on the offset.

The algorithm checks each mesh cell to determine if the texture point is within it or on its boundaries. It is important not to stop at the first match, as a texture point may be on the line between two or more cells; in this case, information about each needs to be considered. If the texture point is indeed inside one cell, the screen position is calculated using bilinear interpolation of the cell's corners. It is important to note that a screen position will always be generated, since the point has already been brought into the mesh in the offset stage.

It is during this cell-by-cell check that the algorithm considers the texture point's offset. If the point lies off an edge, an angle to offset by may be calculated based on the angles of the edges that would in an undistorted cell be parallel to the offset. Without loss of generality, if the point were lying off the left edge of the mesh, the angles of the top and bottom edges of the cell would come into play. The algorithm may interpolate between these angles based on the proximity of the point to the angled edges. In addition to matching skewed mesh cells, this operation also may correct for a mesh that has been rotated.

Similarly, a scale for the offset may be calculated based on the scale of the texture point's neighboring edge as well as its parallel edges. These angles and scales are aggregated over all matching cells. This is important because if a point is offset from an edge between two cells that are angled differently on their non-shared edges, an implementation considering only the first matching cell will not yield visually correct results. Once the angle and scale data from all matching cells is collected, the algorithm uses them to assign the new offset, which will be added to the screen point found for the texture point which was shifted inside the mesh. The angle is simply averaged over all the matching cells. The scale is averaged as well, and then subjected to a nonlinear transformation function that, while not physically accurate, better visually reproduces the expected results.

The case where the texture point is offset in both x and y—that is, when it is a corner, floating free of the corner of the mesh—may be slightly different, as described above with respect to FIGS. 6 and 7. The algorithm calculates the angle of the tangent to both cell edges the texture point is near. Without loss of generality, if the point is the upper left corner, these will be the topmost and leftmost edges of the cell. The algorithm then interpolates between these angles based on the angle created by the original offset. The scale is treated as in the edge case, and, as it is clear that a corner will only intersect with one cell, the algorithm continues to the post-processing of the angle and scale, as above.

Figure 9:
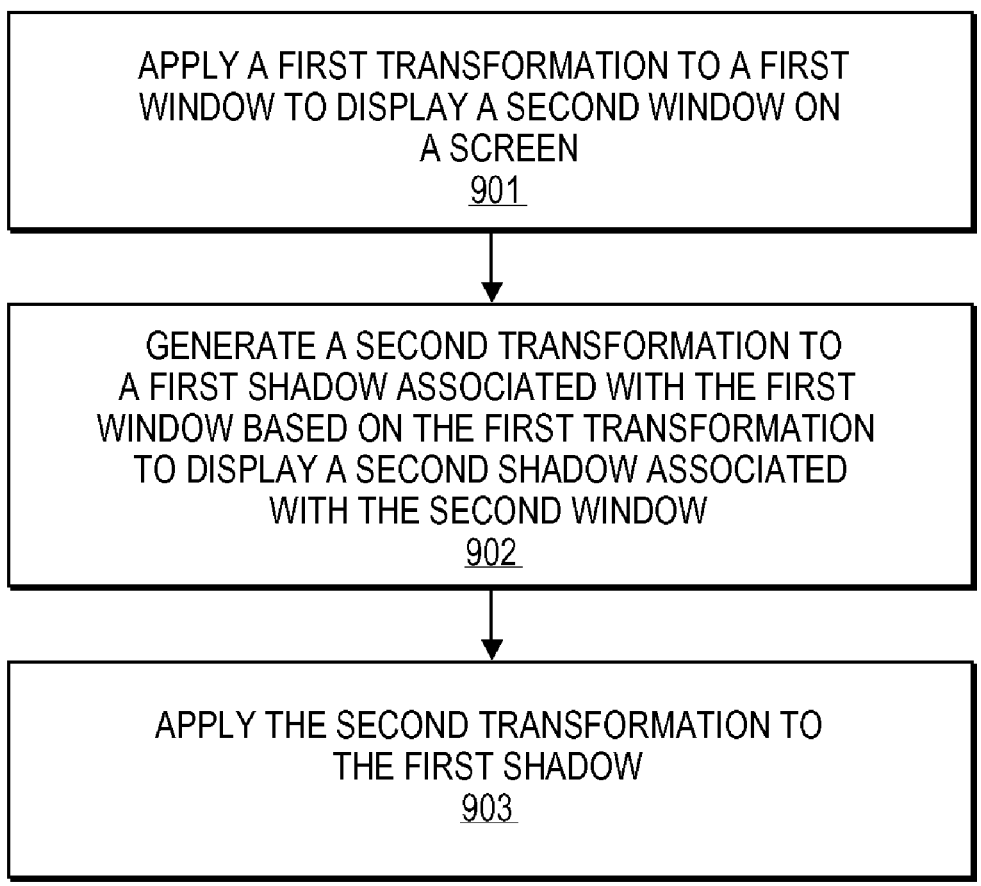
FIG. 9 is a flowchart of one embodiment of a method to applying a transformation to a shadow associated with a window.

FIG. 9 is a flowchart of one embodiment of a method to applying a transformation to a shadow associated with a window. Method 900 begins with operation 901 that involves applying a first transformation to a first window to display a second window on a screen.

Figure 10:
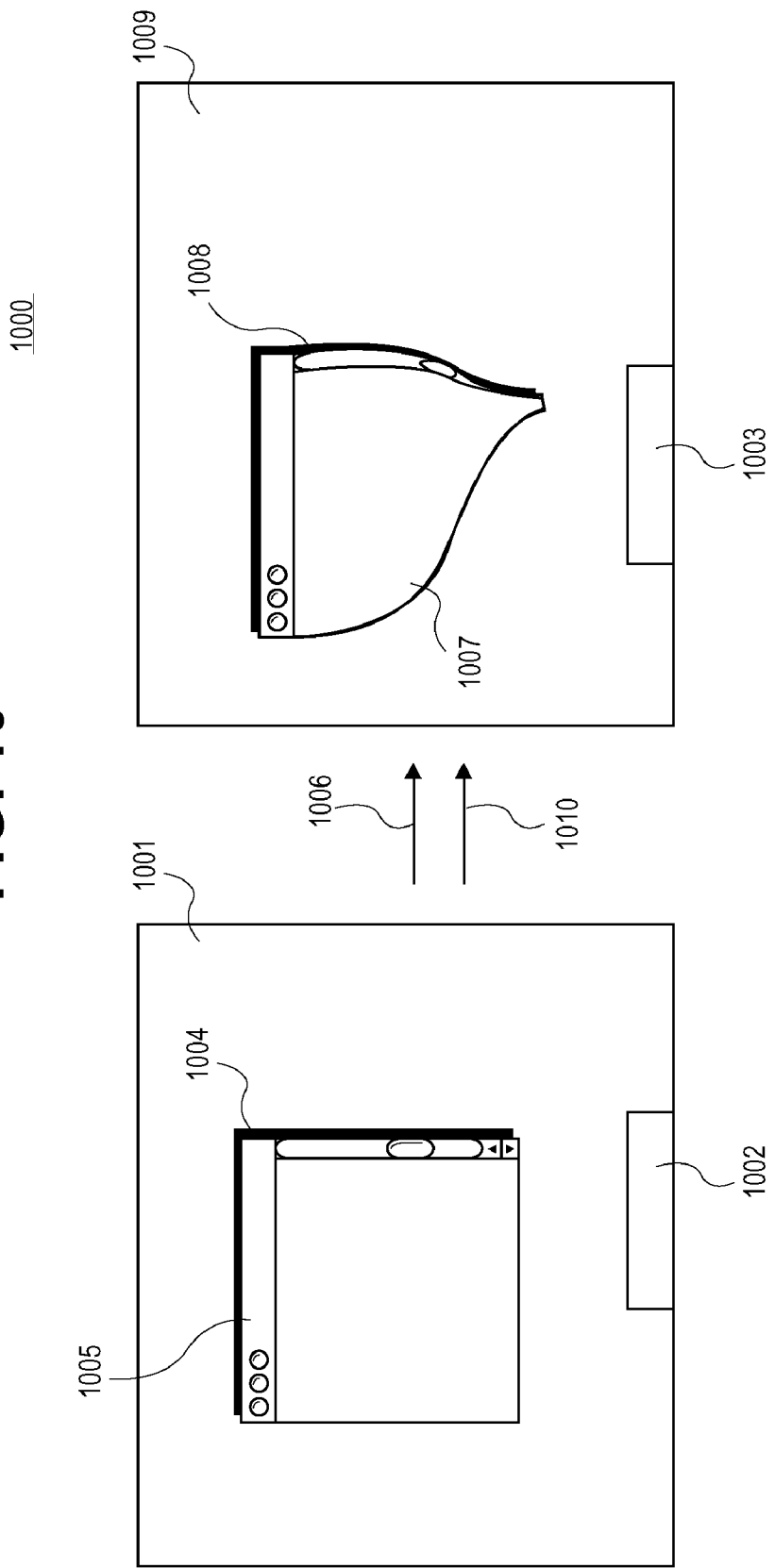
FIG. 10 illustrates one embodiment of transforming a shadow associated with a window.

FIG. 10 illustrates one embodiment of transforming a shadow associated with a window. As shown in FIG. 10, a window 1005 having a shadow 1004 is displayed on screen 1001. Generally, a shadow is a region of darkness where light is blocked by an object. It occupies all of the space behind an opaque object with light in front of it. The cross section of a shadow 1004 includes a two-dimensional silhouette, or reverse projection of the object blocking the light. As shown in FIG. 10, a dock 1002 is displayed on screen 1001, the dock may be used to display frequently used applications, applications that are currently executed by the processor of the data processing system, or both. As shown in FIG. 10, an arbitrary transformation 1006 is applied to window 1005 displayed on a screen 401 to display a transformed window 1007 on screen 1009. As shown in FIG. 10, window 1007 has an arbitrary shape as it minimizes into a dock 1003. In one embodiment, the arbitrary transformation 1006 applied to window 1005 to display window 1007 includes a non-linear transformation. For example, the transformation applied to the window changes the shape of the window in a non-linear fashion.

Referring back to FIG. 9, at operation 902 a second transformation is generated to a first shadow associated with the first window based on the first transformation to display a second shadow associated with the second window. Method 900 continues with operation 903 that involves applying the second transformation to the first shadow.

Referring back to FIG. 10, a second transformation 1010 created based on the first transformation 1006 is applied to shadow 1004 to display a transformed shadow 1008 on screen 1009. Shadow 1008 follows the shape and motion of window 1007 as the window 1007 arbitrarily transforms its shape. In one embodiment, generating the shadow's transformation includes extending the window's transformation, as described in further detail below. In one embodiment, transforming a pre-existing shadow calculated from an untransformed window is performed, as described in further detail below.

The shadow's transformation may be calculated by extending the transformation of the window itself, as described above. Further, this transformation may be applied lazily at render time and does not change the shadow's bits. Thus the shadow bitmap can remain cached and be used repeatedly, for every frame of animation. Recalculating the shadow's transformation is much less expensive than recalculating a bitmap from the transformed window's shape. This method therefore yields visually correct results at very little cost. Generating a drop shadow from a window may be expensive. It requires performing a blur iterating over every pixel of window content. Thus the time required to calculate a window shadow from a full-screen window is significant. This means that it is generally impractical to generate new shadows on every frame of a window animation; the frame rate of the animation would stall as the shadows calculated.

Figure 11:
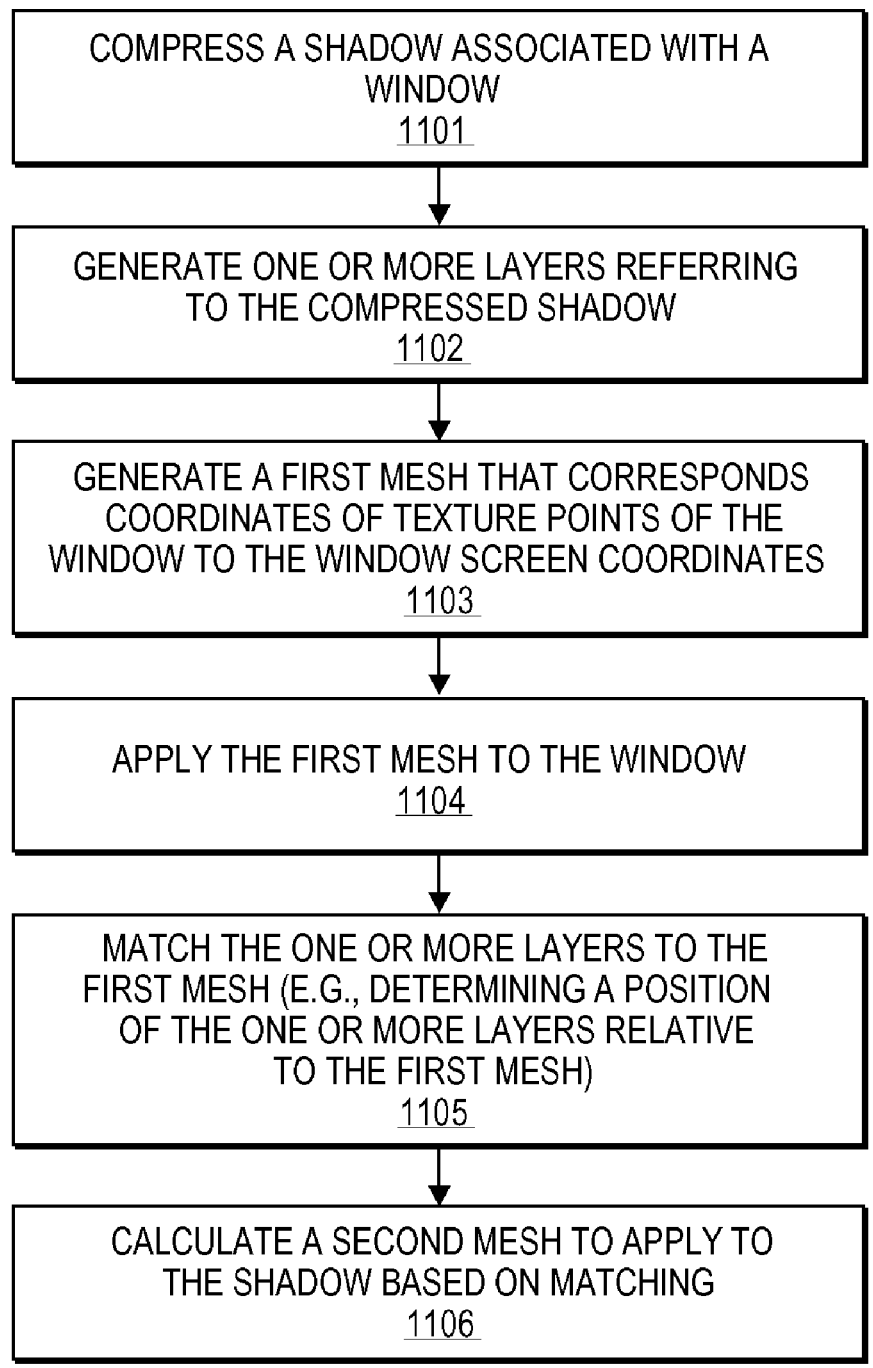
FIG. 11 is a flowchart of one embodiment of a method of generating a transformation to a shadow.

FIG. 11 is a flowchart of one embodiment of a method of generating a transformation to a shadow. Method 1100 begins with operation 1101 that involves compressing a shadow associated with a window. At the lowest level, the window server is a 2D compositing engine. It draws layers of content provided by window content, surfaces, and other sources—to the screen. A particular window's shadow doesn't exist until the layer generated from that window is composed. At that time, the compositor asks for the shadow to be either generated or (more often) restored from a cache.

Figure 12:
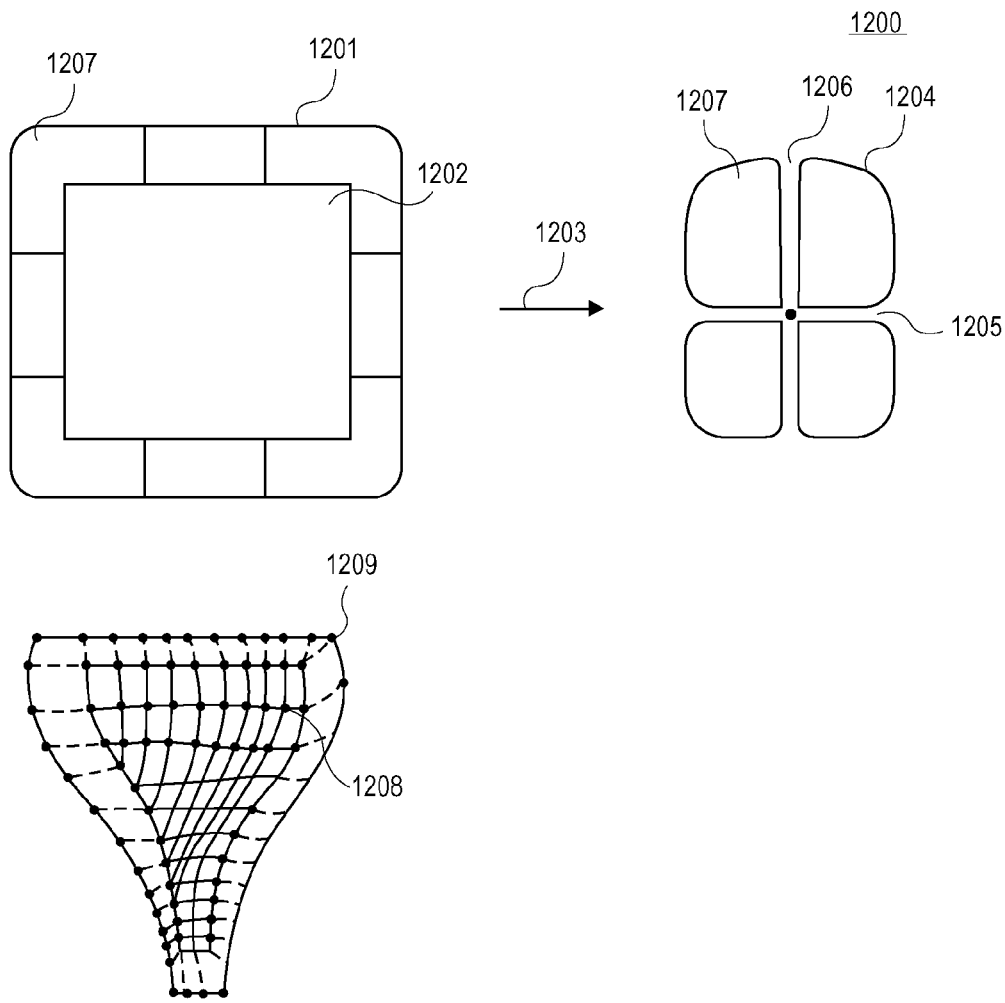
FIG. 12 illustrates one embodiment of generating a transformation for a compressed shadow associated with a window.

FIG. 12 illustrates one embodiment of generating a transformation for a compressed shadow associated with a window. FIG. 12 shows a representation 1202 of a window and a representation 1201 of a shadow in a memory, e.g., a cache. For a standard rectangular window, there may be a lot of redundant information along the sides of the window. The values of corner portions, such as a corner 1207, may change every screen scan. Typically, one row of pixels may represent edge portions, such as portion 1208.

Shadow 1201 may be compressed 1203, so that a compressed shadow 1204 does not include this redundant information, leaving four corners, such as a corner 1207, with a one-pixel-high line, such as line 1206, between each corner. The edge 1208 of the shadow 1201 may be produced by expanding out from that one pixel line, such as line 1206. The compositor creates nine layers that refer to the compressed shadow 1204: a layer for each corner, such as corner 1207, a layer for each edge between corners, such as edge 1206, and one for the middle, such as middle 1205 that is compressed from a representation of window 1202.

Referring back to FIG. 11, method 1100 continues with operation 1102 that involves generating one or more layers referring to the compressed shadow, as described above. At operation 1103 a first mesh may be generated that corresponds coordinate of texture points of the window to the window screen coordinates, as described above. At operation 1104 the first mesh may be applied to the window. At operation 1105, untransformed screen points of each of the one or more layers referring to the compressed shadow are matched to a first mesh associated with the window's transformation, as described above. In one embodiment, a position of the one or more layers relative to the first mesh associated with the window's transformation is calculated.

At operation 1106 a second mesh associated with the shadow's transformation is calculated for each of the one or more layers based on matching. The second mesh may be assigned to the untransformed shadow to perform shadow's transformation while preserving the relationship that the window and the shadow had in the non transformed state.

Referring back to FIG. 12, a shadow's mesh 1209 associated with the shadow's transformation is calculated from window's mesh 1208. In one embodiment, calculating of the shadow's mesh 1209 includes matching of the untransformed screen points of each of the one or more layers referring to the compressed shadow 1204 to the window's mesh 1208. In the old implementation, when the compositor asked for a shadow from a transformed window, the shadow would be re-calculated based on the transformed shape of the window. Now, the shadow is calculated based on the untransformed shape, meaning that in most cases a cached, compressed shadow will be used. The compositor then uses the mesh-matching functionality set forth above to match each of the nine layers generated from that compressed shadow to the appropriate position and warp based on the window's mesh. This is very fast compared to regenerating the shadow; thus, full-framerate animation involving window shadows is now possible. In another embodiment, the shadow's transformation is generated for a non-compressed shadow. In that case, only one layer may be generated out of the shadow. The shadow's mesh may be created as if the shadow were a second window backing a first window, as described above.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A machine-implemented method, comprising:
   obtaining first data associated with a first transformation to a first window, the first transformation relates a first texture point of the first window to a first arbitrary point; and
   creating a second transformation for a second window based on matching the second window to the first transformation, the second transformation relates a second texture point of the second window to a second arbitrary point, wherein the creating the second transformation comprises:

determining a relative location between a second untransformed screen point of the second window and one or more first structure points of the first transformation; and generating, based on the determination, a second structure point for the second transformation.

2. The machine-implemented method of claim 1, further comprising obtaining second data associated with a relationship between the second window and the first window.

3. The machine-implemented method of claim 1, wherein the first transformation includes a non-linear transformation.

4. The machine-implemented method of claim 1, further comprising:

applying the first transformation to the first window; and
applying the second transformation to the second window.

5. The machine-implemented method of claim 1, wherein the creating the second transformation includes:

matching the second untransformed screen point of the second window to one or more structure points of the first transformation; and
providing the second structure point for the second transformation based on the matching.

6. The machine-implemented method of claim 1, wherein the creating the second transformation includes:

determining the second untransformed screen point of the second window matches to a first structure point of the first transformation; and
copying the first structure point to provide the second structure point for the second transformation.

7. The machine-implemented method of claim 6, wherein the copying includes modifying texture coordinates of the first structure point to match to the second window while preserving arbitrary coordinates of the first structure point.

8. The machine-implemented method of claim 1, wherein the creating the second transformation includes:

determining the second untransformed screen point of the second window is between first structure points of the first transformation; and
interpolating the first structure points to generate the second structure point for the second transformation.

9. The machine-implemented method of claim 1, wherein the creating the second transformation includes:

determining the second untransformed screen point of the second window is outside the first transformation; and
generating the second structure point for the second transformation based on characteristics of the first transformation and an association of the second untransformed screen point of the second window to the first window.

10. The machine-implemented method of claim 1, wherein the second window includes a shadow of the first window.

11. A machine-implemented method, comprising:

applying a first transformation to a first window to display a second window on a screen; and
generating a second transformation for a first shadow associated with the first window based on matching the first shadow to the first transformation to display a second shadow associated with the second window, wherein the generating the second transformation comprises:
matching one or more layers referring to the first shadow to a first structure associated with the first transformation; and
calculating, based on the matching, a second structure associated with the second transformation for the one or more layers.

12. The machine-implemented method of claim 11, wherein the first transformation includes a non-linear transformation.

13. The machine-implemented method of claim 11, wherein the generating the second transformation includes extending the first transformation.

14. The machine-implemented method of claim 11, further comprising applying the second transformation to the first shadow.

15. The machine-implemented method of claim 11, further comprising:

compressing the first shadow; and
generating the one or more layers referring to the compressed first shadow.

16. A machine-readable medium storing executable program instructions which cause a data processing system to perform operations comprising:

obtaining first data associated with a first transformation to a first window, the first transformation relates a first texture point of the first window to a first arbitrary point; and
creating a second transformation for a second window based on matching the second window to the first transformation, the second transformation relates a second texture point of the second window to a second arbitrary point, wherein the creating the second transformation comprises:
determining a relative location between a second untransformed screen point of the second window and one or more first structure points of the first transformation; and
generating, based on the determination, a second structure point for the second transformation.

17. The machine-readable medium of claim 16, further including data that cause the data processing system to perform operations comprising obtaining second data associated with a relationship between the second window and the first window.

18. The machine-readable medium of claim 16, wherein the first transformation includes a non-linear transformation.

19. The machine-readable medium of claim 16, further including data that cause the data processing system to perform operations comprising:

applying the first transformation to the first window; and
applying the second transformation to the second window.

20. The machine-readable medium of claim 16, wherein the creating the second transformation includes:

matching the second untransformed screen point of the second window to one or more structure points of the first transformation; and
providing the second structure point for the second transformation based the matching.

21. The machine-readable medium of claim 16, wherein the creating the second transformation includes:

determining the second untransformed screen point of the second window matches to a first structure point of the first transformation; and
copying the first structure point to provide the second structure point for the second transformation.

22. The machine-readable medium of claim 21, wherein the copying includes modifying texture coordinates of the first structure point to match to the second window while preserving arbitrary coordinates of the first structure point.

23. The machine-readable medium of claim 16, wherein the creating the second transformation includes:

determining the second untransformed screen point of the second window is between first structure points of the first transformation; and
interpolating the first structure points to generate the second structure point for the second transformation.

24. The machine-readable medium of claim 16, wherein the creating the second transformation includes:
- determining the second untransformed screen point of the second window is outside the first transformation; and
- generating the second structure point for the second transformation based on characteristics of the first transformation and an association of the second untransformed screen point of the second window to the first window.

25. The machine-readable medium of claim 16, wherein the second window includes a shadow of the first window.

26. A machine-readable medium storing executable program instructions, which cause a data processing system to perform operations comprising:
- applying a first transformation to a first window to display a second window on a screen; and
- generating a second transformation for a first shadow associated with the first window based on matching the first shadow to the first transformation to display a second shadow associated with the second window, wherein the generating the second transformation comprises:
  - matching one or more layers referring to the first shadow to a first structure associated with the first transformation; and
  - calculating, based on the matching, a second structure associated with the second transformation for the one or more layers.

27. The machine-readable medium of claim 26, wherein the first transformation includes a non-linear transformation.

28. The machine-readable medium of claim 26, wherein the generating the second transformation includes extending the first transformation.

29. The machine-readable medium of claim 26, further including data that cause the data processing system to perform operations comprising applying the second transformation to the first shadow.

30. The machine-readable medium of claim 26, further including data that cause the data processing system to perform operations comprising:
- compressing the first shadow; and
- generating the one or more layers referring to the compressed first shadow.

31. A data processing system, comprising:
- a processor;
- a memory coupled to the processor; and
- a display coupled to the processor, wherein the processor is configured to:
  - obtain first data associated with a first transformation to a first window, the first transformation relates a first texture point of the first window to a first arbitrary point; and
  - create a second transformation for a second window based on matching the second window to the first transformation, the second transformation relates a second texture point of the second window to a second arbitrary point, wherein the creating the second transformation comprises:
    - determining a relative location between a second untransformed screen point of the second window and one or more first structure points of the first transformation; and
    - generating, based on the determination, a second structure point for the second transformation.

32. The data processing system of claim 31, wherein the processor is configured to obtain second data associated with between the second window and the first window.

33. The data processing system of claim 31, wherein the first transformation includes a non-linear transformation.

34. The data processing system of claim 31, wherein the processor is further configured to:
- apply the first transformation to the first window; and
- apply the second transformation to the second window.

35. The data processing system of claim 31, wherein the creating the second transformation includes:
- matching the second untransformed screen point of the second window to one or more structure points of the first transformation; and
- providing the second structure point for the second transformation based on the matching.

36. The data processing system of claim 31, wherein the creating the second transformation includes:
- determining the second untransformed screen point of the second window matches to a first structure point of the first transformation; and
- copying the first structure point to provide the second structure point for the second transformation.

37. The data processing system of claim 36, wherein the copying includes modifying texture coordinates of the first structure point to match to the second window while preserving arbitrary coordinates of the first structure point.

38. The data processing system of claim 31, wherein the creating the second transformation includes:
- determining the second untransformed screen point of the second window is between first structure points of the first transformation; and
- interpolating the first structure points to generate the second structure point for the second transformation.

39. The data processing system of claim 31, wherein the creating the second transformation includes:
- determining the second untransformed screen point of the second window is outside the first transformation; and
- generating the second structure point for the second transformation based on characteristics of the first transformation and an association of the second untransformed screen point of the second window to the first window.

40. The data processing system of claim 31, wherein the second window includes a shadow of the first window.

41. A data processing system, comprising:
- a processor;
- a memory coupled to the processor; and
- a display coupled to the processor, wherein the processor is configured to:
  - apply a first transformation to a first window to display a second window on a screen; and
  - generate a second transformation to a first shadow associated with the first window based on matching the second window to the first transformation to display a second shadow associated with the second window, wherein the generating the second transformation comprises:
    - matching one or more layers referring to the first shadow to a first structure associated with the first transformation; and
    - calculating, based on the matching, a second structure associated with the second transformation for the one or more layers.

42. The data processing system of claim 41, wherein the first transformation includes a non-linear transformation.

43. The data processing system of claim 41, wherein the generating the second transformation includes extending the first transformation.

44. The data processing system of claim 41, wherein the processor is further configured to apply the second transformation to the first shadow.

45. The data processing system of claim 41, wherein the processor is further configured to:

compress the first shadow; and generate one or more layers referring to the compressed first shadow.

46. A data processing system, comprising:

means for obtaining first data associated with a first transformation to a first window, the first transformation relates a first texture point of the first window to a first arbitrary point; and means for creating a second transformation for a second window based on matching the second window to the first transformation, the second transformation relates a second texture point of the second window to a second arbitrary point, wherein at least one of the means for obtaining and means for creating includes a processor, wherein the creating the second transformation comprises:

determining a relative location between a second untransformed screen point of the second window and one or more first structure points of the first transformation; and generating, based on the determination, a second structure point for the second transformation.

47. The data processing system of claim 46, further comprising means for obtaining second data associated with a relationship between the second window and the first window.

48. The data processing system of claim 46, wherein the first transformation includes a non-linear transformation.

49. A data processing system, comprising:

means for applying a first transformation to a first window to display a second window on a screen; and means for generating a second transformation for a first shadow associated with the first window based on matching the first shadow to the first transformation to display a second shadow associated with the second window, wherein the generating the second transformation comprises:

matching one or more layers referring to the first shadow to a first structure associated with the first transformation; and calculating, based on the matching, a second structure associated with the second transformation for the one or more layers; and wherein at least one of the means for applying and means for generating includes a processor.

50. The data processing system of claim 49, wherein the first transformation includes a non-linear transformation.

51. The data processing system of claim 49, wherein means for the generating the second transformation includes means for extending the first transformation.

* * * * *